P. D. RAYMOND.
STUMP BURNER.
APPLICATION FILED JULY 18, 1917.

1,315,412.

Patented Sept. 9, 1919.

WITNESSES

INVENTOR
P. D. Raymond,
BY Victor J. Evans
ATTORNEY

UNITED STATES PATENT OFFICE.

PURLEY D. RAYMOND, OF PORTLAND, OREGON.

STUMP-BURNER.

1,315,412.   Specification of Letters Patent.   Patented Sept. 9, 1919.

Application filed July 18, 1917. Serial No. 181,326.

*To all whom it may concern:*

Be it known that I, PURLEY D. RAYMOND, a citizen of the United States, residing at Portland, in the county of Multnomah and State of Oregon, have invented new and useful Improvements in Stump-Burners, of which the following is a specification.

This invention relates to stump burners.

An object of the present invention is to provide means for maintaining an intensified heat at the base of the stump for the quick and efficient removal of the same, said means including a number of heat retaining elements arranged at the base in a manner to enable them to automatically move by gravity toward the stump, as the burning progresses, the said heat retaining elements being arranged within a casing, which casing also acts as a flue to provide a circulation of air.

The invention further contemplates the provision of a motor driven fan to provide a draft through the flue, which, acting upon the heat retaining elements, maintains them at an intense heat and drives said heat toward the stump.

With the above and other objects in view, the invention consists of the following novel combination and arrangement of parts, hereinafter more fully described and illustrated in the accompanying drawings, in which—

Figure 1:
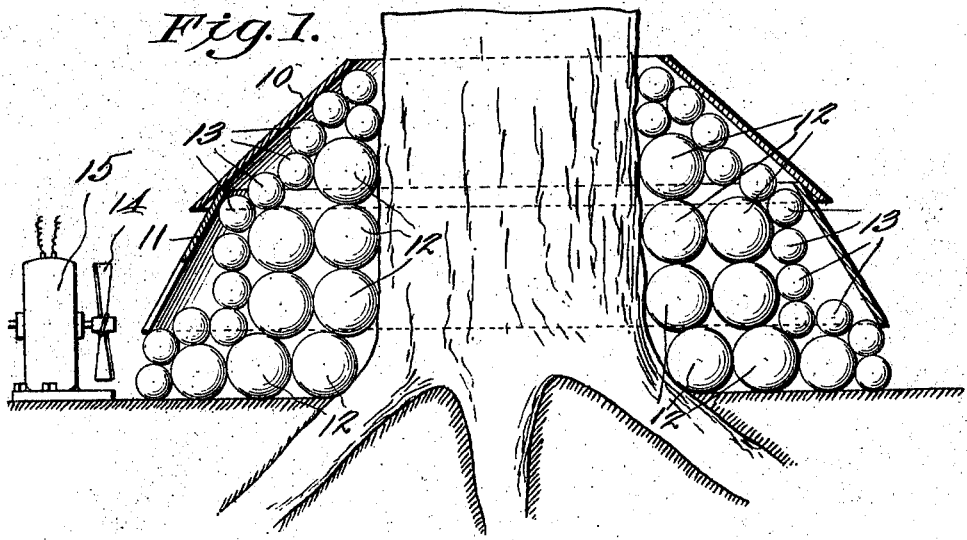
Figure 2:
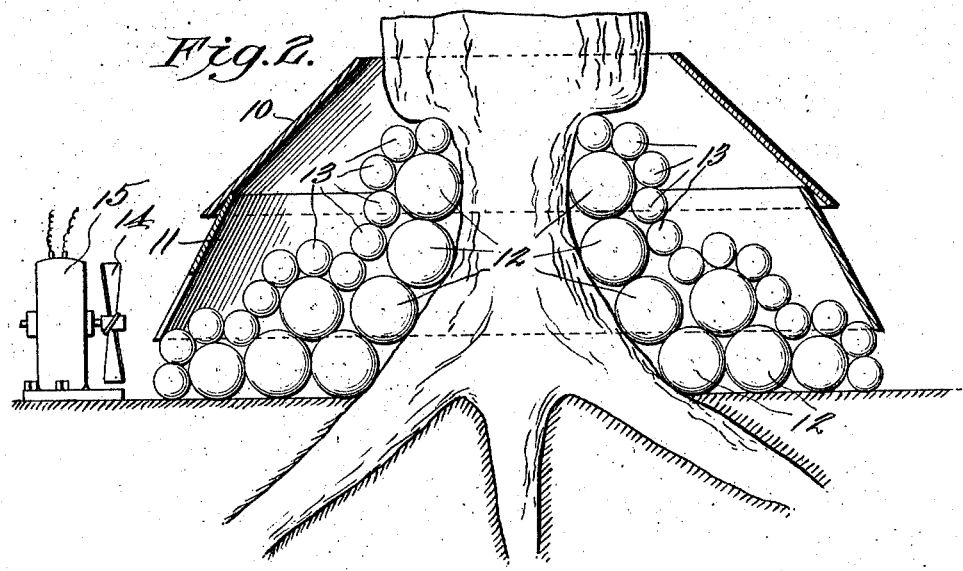

Figure 1 is an elevation of a stump with the invention applied thereto, the said invention being shown in section; and Fig. 2 is a similar view showing the manner in which the heat retaining elements move by gravity toward the stump as the stump is consumed by the fire.

Referring to the drawings in detail, like characters of reference denote corresponding parts throughout the several views.

The invention as illustrated in the accompanying drawings, includes a casing which is adapted to be placed around the stump and comprises overlapping sections 10 and 11, the section 10 lying above the section 11 and capable of being moved inwardly as the stump is burned.

Within the casing or below the same there is provided a plurality of heat retaining elements 12 and 13 of different sizes. These heat retaining elements are preferably round in shape and are composed of any suitable heat retaining material, such as burnt clay or iron, the former, however, being preferred for its cheapness and the ease with which it may be obtained.

The burner is arranged around the stump a slight distance therefrom, so as to provide a draft flue and in order to produce a forced draft, so as to intensify the heat, there is provided a fan 14, placed in a convenient position and driven by a suitable motor 15.

Current may be supplied to the motor by any suitable source, for example, from a generator driven by a gas engine or other suitable power and a number of these stump burning devices may be operated simultaneously from the same power.

In the operation of the device, the fire is started in any desired manner, the heat retaining elements being heated and the draft applied. As the stump is burned, the said heat retaining elements will move within the cavity just burnt by gravity, the shape of the said elements causing them to roll inward. By constructing these elements of different sizes and arranging them in the manner shown, that is, with those of the smaller size outermost, they form an effective outer layer for the purpose of burning around the stump and more quickly consuming the same.

It is believed that from the foregoing description, when taken in connection with the accompanying drawings, that the construction, operation and advantages of the invention will be apparent. The right is reserved to make such changes in the form and proportion thereof as will fall within the scope of the claims hereto appended.

Having described the invention, what is claimed is:

1. A device of the class described comprising a casing formed of upper and lower conical sections arranged one upon the other and adapted to be placed around the stump and a plurality of superimposed heat retaining elements located within the casing and in contact with the stump, said heat retaining elements being movable by gravity toward the stump.

2. A device of the class described comprising a casing formed of upper and lower conical sections adapted to be placed around a stump and a plurality of spherical superimposed heat retaining elements located within the casing and in contact with the stump, said heat retaining elements being movable by gravity toward the stump and a casing capable of being moved inwardly to retain said elements in proper position.

3. A device of the class described comprising a casing formed of a lower conical section and an upper conical section resting upon and extending over the upper edge of the lower section and having a relatively small upper edge, said casings being adapted to be placed around a stump and a plurality of superimposed retaining elements located within the casing and in contact with the stump, the relative arrangement of the parts being such as to cause the heat retaining elements to gravitate toward the stump as the latter is burned.

In testimony whereof I affix my signature.

PURLEY D. RAYMOND.

Copies of this patent may be obtained for five cents each, by addressing the "Commissioner of Patents, Washington, D. C."